US010028599B2

(12) United States Patent
Ryner et al.

(10) Patent No.: US 10,028,599 B2
(45) Date of Patent: Jul. 24, 2018

(54) HIGH VELOCITY CHECKOUT TERMINAL

(71) Applicant: Wal-Mart Apollo, LLC, Bentonville, AR (US)

(72) Inventors: Douglas Jahe Ryner, Cave Springs, AR (US); Christopher Ryan Van Briggle, Bentonville, AR (US); Joshua David Osmon, Bentonvile, AR (US); Bruce Crow, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/409,413

(22) Filed: Jan. 18, 2017

(65) Prior Publication Data

US 2017/0208970 A1    Jul. 27, 2017

Related U.S. Application Data

(60) Provisional application No. 62/281,498, filed on Jan. 21, 2016.

(51) Int. Cl.
*A47F 9/04* (2006.01)
(52) U.S. Cl.
CPC ............... *A47F 9/048* (2013.01); *A47F 9/04* (2013.01)
(58) Field of Classification Search
CPC .... A47F 9/02; A47F 9/04; A47F 9/046; A47F 2009/041
See application file for complete search history.

(56) References Cited

U.S. PATENT DOCUMENTS

| 4,182,433 A | 1/1980 | Foster |
| 6,296,185 B1 * | 10/2001 | Dejaeger ................. A47F 9/046 235/383 |
| 7,967,112 B2 | 6/2011 | Kaplan et al. |
| 9,277,833 B1 * | 3/2016 | Vance ........................ A47F 9/04 |
| 2008/0302607 A1 * | 12/2008 | Kaplan ..................... A47F 9/04 186/61 |
| 2013/0062159 A1 * | 3/2013 | Fischer ................... A47F 9/048 198/367 |
| 2014/0151187 A1 | 6/2014 | Phan et al. |

(Continued)

FOREIGN PATENT DOCUMENTS

| EP | 0628273 A2 | 12/1994 |
| EP | 2177135 A1 | 4/2010 |

(Continued)

OTHER PUBLICATIONS

Royston Tri Belt, http://storeequipment.com/newsite/royston-check-out-counters/royston-tri-belt/, last viewed Nov. 20, 2015.

(Continued)

*Primary Examiner* — Mark J Beauchaine
(74) *Attorney, Agent, or Firm* — McCarter & English, LLP; David R. Burns

(57) ABSTRACT

A high velocity checkout terminal is provided. The high velocity checkout terminal includes first and second input terminals for selectively transporting products to a cashier station and first and second output conveyors for transporting products from the cashier station to first and second bagging stations. The high velocity checkout terminal also includes first and second payment terminals for accepting payment for a cost of the products.

22 Claims, 14 Drawing Sheets

(56) References Cited

U.S. PATENT DOCUMENTS

| | | |
|---|---|---|
| 2014/0353115 A1 | 12/2014 | Baitz et al. |
| 2015/0194023 A1* | 7/2015 | Brackenridge ........ G06Q 30/06 235/380 |
| 2015/0272349 A1 | 10/2015 | Seljeseth |
| 2016/0321877 A1 | 11/2016 | Baitz et al. |

FOREIGN PATENT DOCUMENTS

| | | |
|---|---|---|
| EP | 2472432 A1 | 7/2012 |
| FR | 2695816 A1 | 3/1994 |
| GB | 1447574 | 8/1976 |
| WO | 2013120875 A2 | 8/2013 |

OTHER PUBLICATIONS

Great Britain Search Report for Application No. 1701016.6, dated Jul. 3, 2017. 4 pages.

International Search Report and Written Opinion from International Patent Application No. PCT/GB2014/053419 dated Nov. 22, 2013, (9 pages).

* cited by examiner

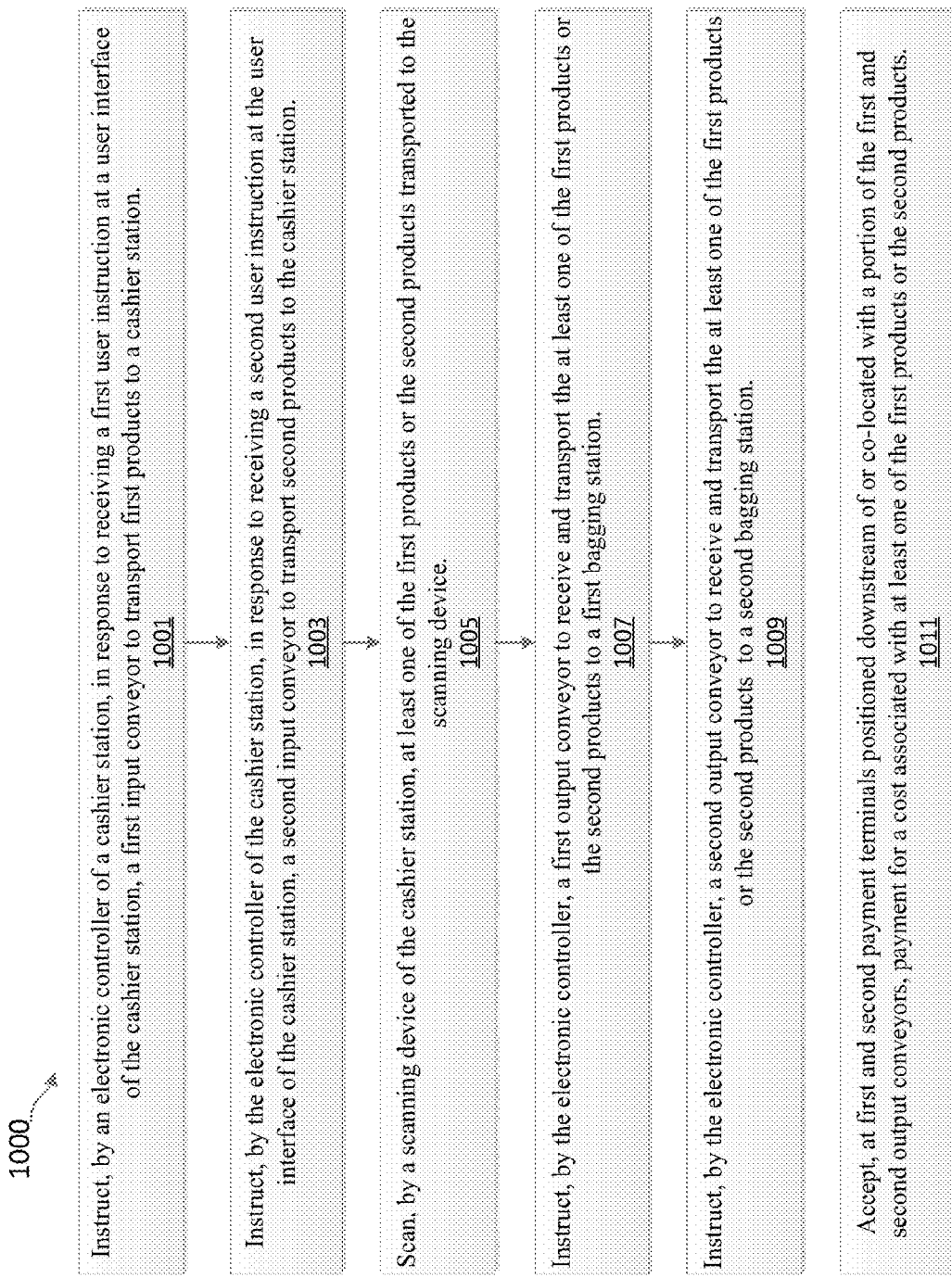

HIGH VELOCITY CHECKOUT TERMINAL

CROSS-REFERENCE TO RELATED PATENT APPLICATIONS

This application claims priority to U.S. Provisional Application No. 62/281,498 filed on Jan. 21, 2016, the content of each application is hereby incorporated by reference in its entirety.

FIELD OF INVENTION

The disclosure relates generally to product processing systems and more particularly to checkout terminals.

BACKGROUND

Conventionally, checkout terminals include a single input area, a single scanning and payment station, and a single output bagging area. In such systems, subsequent customers must wait for prior customers to vacate the input area to begin loading the input conveyor. The cashier generally has to wait for bagging and payment to be completed before attending to another customer. As a result, such conventional checkout terminals often experience bottlenecks and periods of inactivity where no product scanning is occurring.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 10 is a flow chart illustrating an example method for operating a high velocity checkout terminal in accordance with various embodiments.

DETAILED DESCRIPTION

Figure 1:
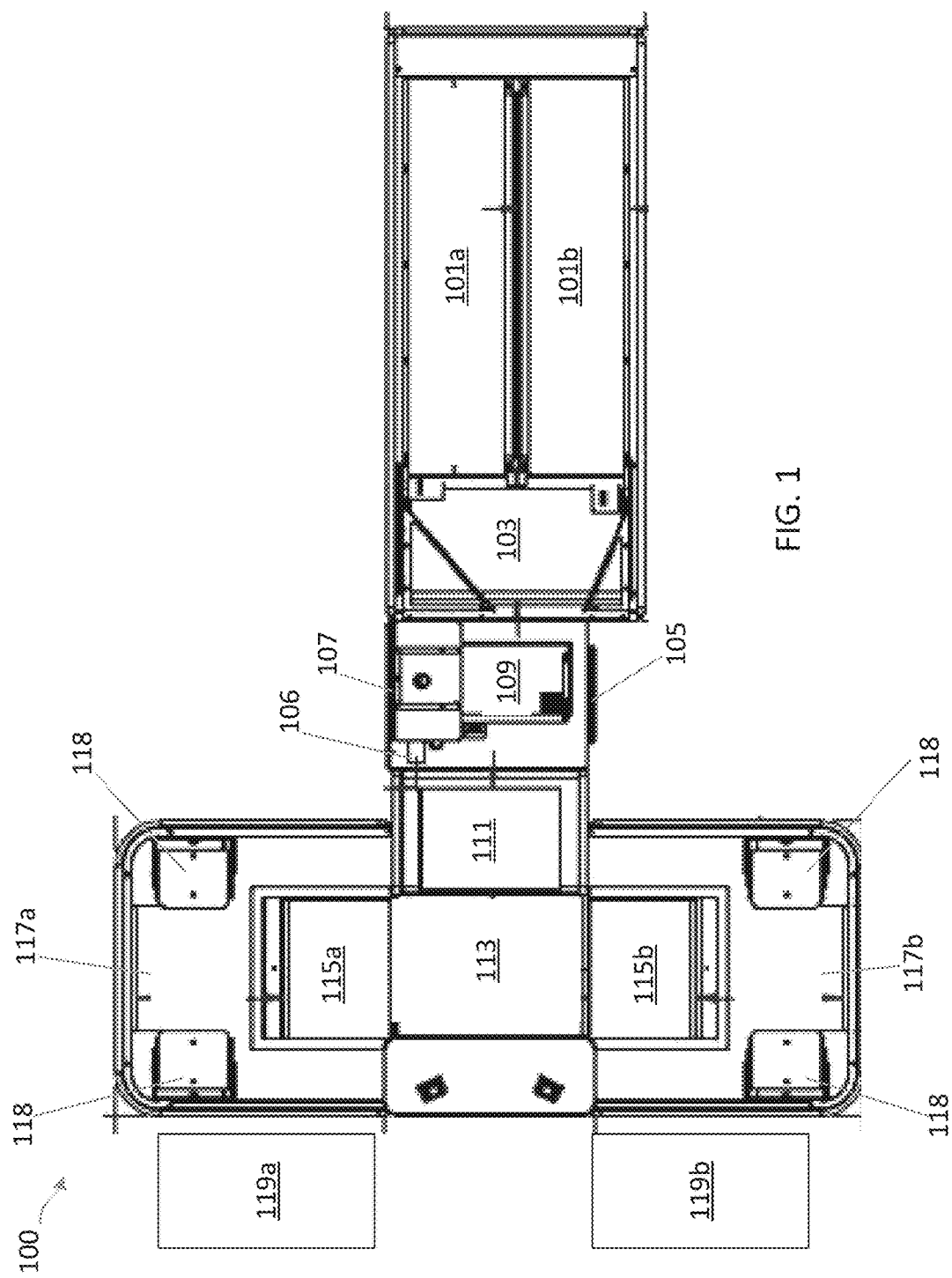
FIG. 1 is a top view of an example high velocity checkout terminal having two inputs and two transverse outputs in accordance with various embodiments.

Referring now to FIG. 1, an example high velocity checkout terminal 100, in accordance with various embodiments, includes a first input conveyor 101a for selectively transporting first products to a cashier station 105. The high velocity checkout terminal 100 also includes a second input conveyor 101b for selectively transporting second products to the cashier station 105. The cashier station 105 includes a scanning device 109 for scanning the first or second products, a user input 107 for receiving a user input, and an electronic controller 106 for controlling the first and second input conveyors 101a, 101b and first and second output conveyors 115a, 115b. The first and second output conveyors 115a, 115b are configured to selectively transport scanned first or second products from the cashier station 105 to first and second bagging stations 117a, 117b to permit customers to bag the scanned products first or second products. The high velocity checkout terminal 100 also includes first and second payment terminals 119a, 119b for accepting payment for the bagged first or second products.

Figure 3:
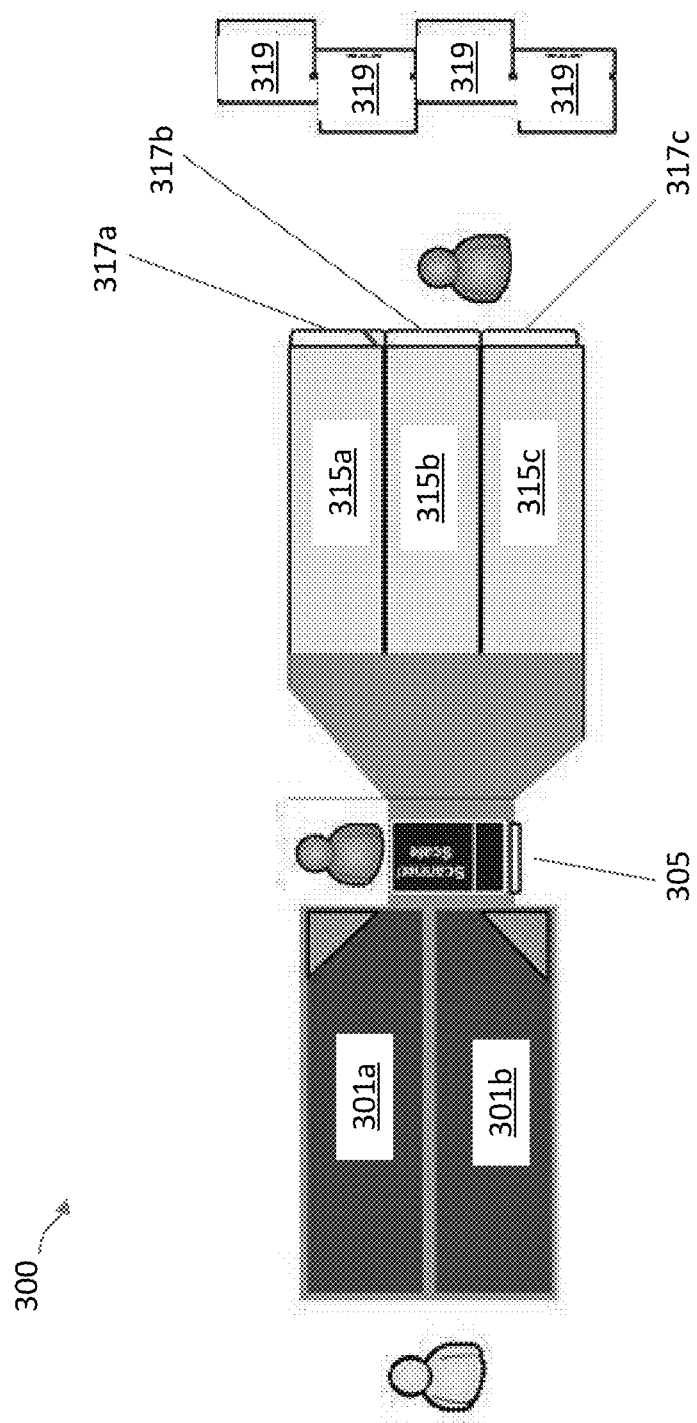
FIG. 3 is a top view of an example high velocity checkout terminal having two inputs and three parallel outputs in accordance with various embodiments.

Although the high velocity checkout terminal 100 of FIG. 1 is illustrated and described herein as having two input conveyors 101a, 101b and two output conveyors 115a, 115b leading to two bagging stations 117a, 117b, it will be apparent in view of this disclosure that, in accordance with various embodiments, any number of input conveyors 101a, 101b can be combined with any number of output conveyors 115a, 115b to lead to any number of bagging stations 117a, 117b. Additionally, as illustrated in FIG. 3 and described with greater detail below, it will be apparent in view of this disclosure that the number of input conveyors 101a, 101b, 301a, 301b, in accordance with various embodiments, does not need to match the number of output conveyors 115a, 115b, 315a, 315b, 315c. Similarly, in accordance with various embodiments (not shown), the number of bagging stations 117a, 117b doe not need to match the number of input conveyors 101a, 101b or the number of output conveyors 115a, 115b. For example, in accordance with various embodiments (not shown), each output conveyor 115a, 115b can be configured to selectively transport products to one of a plurality of bagging stations. It will further be apparent in view of this disclosure that, in accordance with various embodiments, any number of pay stations 119a, 119b can be used with the high velocity checkout terminal 100, regardless of the number of input conveyors 101a, 101b, output conveyors 115a, 115b, or bagging stations 117a, 117b that are present. Furthermore, although the cashier station 105 is depicted as having a single scanning device 109, it will be apparent in view of this disclosure that any number of scanning devices 109 can be included at the cashier station. For example, the cashier station 105, in accordance with various embodiments, can include one scanning device 109 for each input belt 101a, 101b.

In accordance with various embodiments, the high velocity checkout terminal 100 can also include a pre-scan holding area 103 for holding first or second products transported by the first or second input conveyor 101a, 101b prior to scanning by the scanning device 109. Advantageously, the pre-scan holding area can be configured to funnel products more centrally toward the cashier station 105 than a direct connection to the terminal end of the first or second output conveyors 101a, 101b, which are transversely offset from the scanning device 109. Further advantageously, by receiving the first or second products prior to scanning, the pre-scan holding area 103 permits at least a portion of the active one of the first or second input conveyors 101a, 101b to be evacuated of products during scanning, thereby creating space for another customer to begin loading products onto the input conveyor 101a, 101b.

In accordance with various embodiments, the high velocity checkout terminal 100 can also include one or more of a transfer conveyor 111 or a transverse conveyor 113 for selectively guiding the scanned first or second products to the first or second output conveyor 115a, 115b. For example, if the scanned first or second products are to be directed to the first bagging station 117a via the first output conveyor 115a, the transfer conveyor 111 would transport the scanned products to the transverse conveyor 113, which would operate in a first direction to transport the products to the first output conveyor 115a. Conversely, if the scanned first or second products are to be directed to the second bagging station 117b via the second output conveyor 115b, the transfer conveyor 111 would transport the scanned products to the transverse conveyor 113, which would operate in a second direction to transport the products to the second output conveyor 115b. Although depicted as including the transfer conveyor 111 and the transverse conveyor 113 for selectively guiding the scanned first or second products to the first or second output conveyor 115a, 115b, it will be apparent in view of this disclosure that, in accordance with various embodiments, other configurations can be used to direct the scanned first or second products to the correct output conveyor 115a, 115b. For example, in accordance with some embodiments, the transfer conveyor 111 and the transverse conveyor 113 can be replaced by a movable divider wall for reconfiguring a pathway between the cashier station 105 and the desired output conveyor 115a, 115b (i.e., by opening the desired path and simultaneously blocking the undesired path). In accordance with some embodiments, the output conveyors 115a, 115b can be configured to permit the cashier operating the cashier station 105 to directly place the scanned products onto the appropriate output conveyor 115a, 115b.

First and second input conveyors 101a,101b, transfer conveyor 111, transverse conveyor 113, and first and second output conveyors 115a, 115b, in accordance with various embodiments, can include, for example, one or more belt conveyors, slider bed conveyors, wire mesh belt conveyors, roller conveyors, skatewheel conveyors, ball transfer tables, gravity conveyors, belt over roller conveyors, motor driven roller conveyors, zero pressure conveyors, tiltable tables or platforms, stationary tables or platforms, sloped chutes, any other suitable conveyor for transporting first or second products, or combinations thereof. The pre-scan holding area 103, in accordance with various embodiments, can include, for example, one or more of a flat table or platform, a sloped chute, a tiltable table or platform, any other suitable defined holding area configured to receive first or second products form the first or second input conveyors 101a, 101b, or combinations thereof. It will be apparent in view of this disclosure that, although the first and second input conveyors 101a, 101b are shown as being parallel along a single axis with the cashier station 105, the first and second input conveyors 101a, 101b can, in accordance with various embodiments, be positioned in any configuration (e.g., angled relative to the cashier station 105, oppositely positioned transverse to the cashier station 105, configured in a y-shape, configured with two curved input belts in a wishbone configuration, or any other suitable configuration).

Similarly, it will be apparent in view of this disclosure that, although the first and second output conveyors 115a, 115b are shown as being oppositely positioned transverse to the cashier station 105, the first and second output conveyors 115a, 115b can, in accordance with various embodiments, be positioned in any configuration (e.g., angled relative to the cashier station 105, parallel along a single axis with the cashier station 105, configured in a y-shape, configured with two curved input belts in a wishbone configuration, or any other suitable configuration).

Cashier station 105, in accordance with various embodiments, can include the scanning device 109, the user input device 107, and the electronic controller 106. The electronic controller 106 can include, for example, a programmable logic controller, an electronic speed controller, an electronic throttle control, a microcontroller, an application specific integrated circuit, any other suitable electronic controller, or combinations thereof. In accordance with various embodiments, the electronic controller 106 is in electronic communication with at least one of the first and second input conveyors 101a,101b, the transfer conveyor 111, the transverse conveyor 113, and the first and second output conveyors 115a, 115b for controlling an operation thereof. In accordance with various embodiments, the high velocity checkout terminal 100 can include one or more sensors (not shown) in electronic communication with the electronic controller 106 for informing the operation of the one or more of the first and second input conveyors 101a,101b, the transfer conveyor 111, the transverse conveyor 113, and the first and second output conveyors 115a, 115b. Such sensors, in accordance with various embodiments, can include, for example, pressure sensors or optical sensors for detecting a presence of one or more products and/or for detecting a position of one or more products along a length of one or more of the conveyors 101a, 101b, 111, 113, 115a, 115b. For example, the transfer conveyor 111, the transverse conveyor 113, and/or the first and second output conveyors 115a, 115b, in accordance with various embodiments, can include, for example, a pressure sensor, a weight sensor, a motion sensor, a video camera, an optical sensor, or an infrared sensor for detecting a presence of a product thereon. In response to detection of the presence of the product, the electronic controller 106 can recognize a need to activate the transfer conveyor 111, the transverse conveyor 113, the first output conveyor 115a, or the second output conveyor 115b and transmit one or more activation signals. Similarly, the one or more sensors can detect an absence of products on an active one of the one or more of the conveyors 101a, 101b, 111, 113, 115a, 115b and, in response, the electronic controller can transmit one or more termination signals. Furthermore, in accordance with various embodiments, one or more of the first and second bagging stations 117a, 117b and the first and second payment terminals 119a, 119b can include an activity sensor (e.g., a pressure sensor, a weight sensor, a motion sensor, a video camera, an optical sensor, or an infrared sensor) in electronic communication with the electronic controller 106 for indicating a presence of a customer and/or products. Thereby, the electronic controller 106 can determine whether or not to route products or customers to that particular bagging station 117a, 117b or payment terminal 119a, 119b.

The input device 107 can include, for example, one or more of a touch screen device, a computer keyboard, a computer mouse, a voice command device, a button, a switch, a lever, a keypad, any other suitable device for providing a user input to the electronic controller 106, or combinations thereof. The scanning device 109 can include, for example, one or more of an optical scanner, an infrared scanner, a radio frequency identification (RFID) reader, a near field communications (NFC) reader, a digital camera, any other suitable scanning device, or combinations thereof. In accordance with some embodiments, the electronic controller 106, the user input device 107, and the scanning device 109 can be integrated in a unitary point of sale (POS) terminal. In accordance with some embodiments, one or more of the electronic controller 106, the user input device 107, and the scanning device 109 can be a separate hardware component co-located at the cashier station 105. For example, in accordance with some embodiments, the cashier station can include a POS terminal having the user input device 107 incorporated therein and be in electronic communication with separate hardware comprising the electronic controller 106 and the scanning device 109. In accordance with some embodiments, the user input device 107 can include separate hardware (e.g., one or more of a rocker switch, a lever, a button, a keypad) in electronic communication with the electronic controller 106.

In accordance with various embodiments, wherein the user input device 107 is integrated with the POS, the electronic controller 106 can automatically determine a preferred path for the products to follow. For example, the cashier can indicate, at the user input device 107, that the cashier is commencing a first progression at the input device 107, at which point the electronic controller will select a combination of one of the first and second input conveyors 101a, 101b, one of the first and second output conveyors 115a, 115b, one of the first and second bagging stations 117a, 117b, and (if applicable) one of the payment terminals 119a, 119b for use with the first progression. As will be described with further detail below, a single payment terminal 119a, 119b does not necessarily need to be designated for any particular progression. The electronic controller 106 then activates the selected conveyors and (if applicable) the selected payment terminal for use during the first progression. Upon completion of the scanning phase for the first transaction, the cashier can indicate, at the user input device 107, that the first progression scanning is complete and/or that the cashier intends to commence scanning for a second progression. The electronic controller 106 can then select a second combination of one of the first and second input conveyors 101a, 101b, one of the first and second output conveyors 115a, 115b, one of the first and second bagging stations 117a, 117b, and (if applicable) one of the payment terminals 119a, 119b for use with the second progression. Generally, the electronic controller 106 can select the second combination based on historical data (i.e., to avoid using the input conveyors 101a, 101b, output conveyors 115a, 115b, bagging stations 117a, 117b, and payment terminals 119a, 119b assigned to the immediately previous progression), based on sensor data (e.g., as described above), or based on any other suitable feedback. In accordance with various embodiments, the electronic controller 106 can select from one or more predefined paths (e.g., a first path flowing from the first input conveyor 101a to the first output belt 115a to the first bagging station 117a to the first payment terminal 119a or a second path flowing from the second input conveyor 101b to the second output belt 115b to the second bagging station 117b to the second payment terminal 119b) or can independently select each individual component for the creation of a custom path for each individual progression. It will be apparent in view of this disclosure that independent selection of each individual component, in accordance with various embodiments, can be particularly beneficial in an asymmetric system (i.e., the number of input conveyors of the checkout terminal does not match the number of output conveyors or payment terminals) as shown, for example, in FIG. 3.

First and second bagging stations 117a, 117b can be any area configured to receive the scanned first or second products from the first or second output conveyors 115a, 115b and to permit a customer to bag the first or second products. In accordance with various embodiments, the first and second bagging stations 117a, 117b can include one or more bag racks 118 for holding bags during bagging. Although the first and second bagging stations 117a, 117b are shown as being oppositely positioned along an axis transverse to the first and second input belts 101a, 101b, it will be apparent in view of this disclosure that the first and second bagging stations 117a, 117b can be positioned in any configuration at an end of the first and second output conveyors 115a, 115b.

First and second payment terminals 119a, 119b, in accordance with various embodiments, can include any device suitable for accepting payment for a cost of the first or second products and can, include, for example, a magnetic stripe reader, a cash drawer, a cash receiving slot, an optical reader, an RFID reader, a NFC reader, any other suitable payment accepting device, and combinations thereof. First and second payment terminals 119a, 119b can, in accordance with various embodiments, be operated by an attendant, by the customer, or both. Although the first and second payment terminals 119a, 119b are depicted in FIG. 1 as being located adjacent to and downstream of a corresponding one of the first and second bagging stations 117a, 117b, it will be apparent in view of this disclosure that, in accordance with various embodiments, the first and second payment terminals 119a, 119b can be positioned at any location downstream of the cashier station (e.g., downstream of or co-located with any of the transfer conveyor 111, the transverse conveyor 113, the first and second output conveyors 115a, 115b, or the first and second bagging stations 117a, 117b). In some embodiments, the first and second payment terminals 119a, 119b can be positioned remotely from (i.e. not co-located with) the other components (e.g., the first and second input conveyors 101a, 101b, the cashier station 105, the first and second output conveyors 115a, 115b, and the first and second bagging stations 117a, 117b). For example, the first and second payment terminals 119a, 119b, in accordance with various embodiments, can be included in a bank of payment terminals located in a central payment area located separately from one or more checkout terminals as shown, for example, in FIGS. 3 and 4).

Figure 2A:
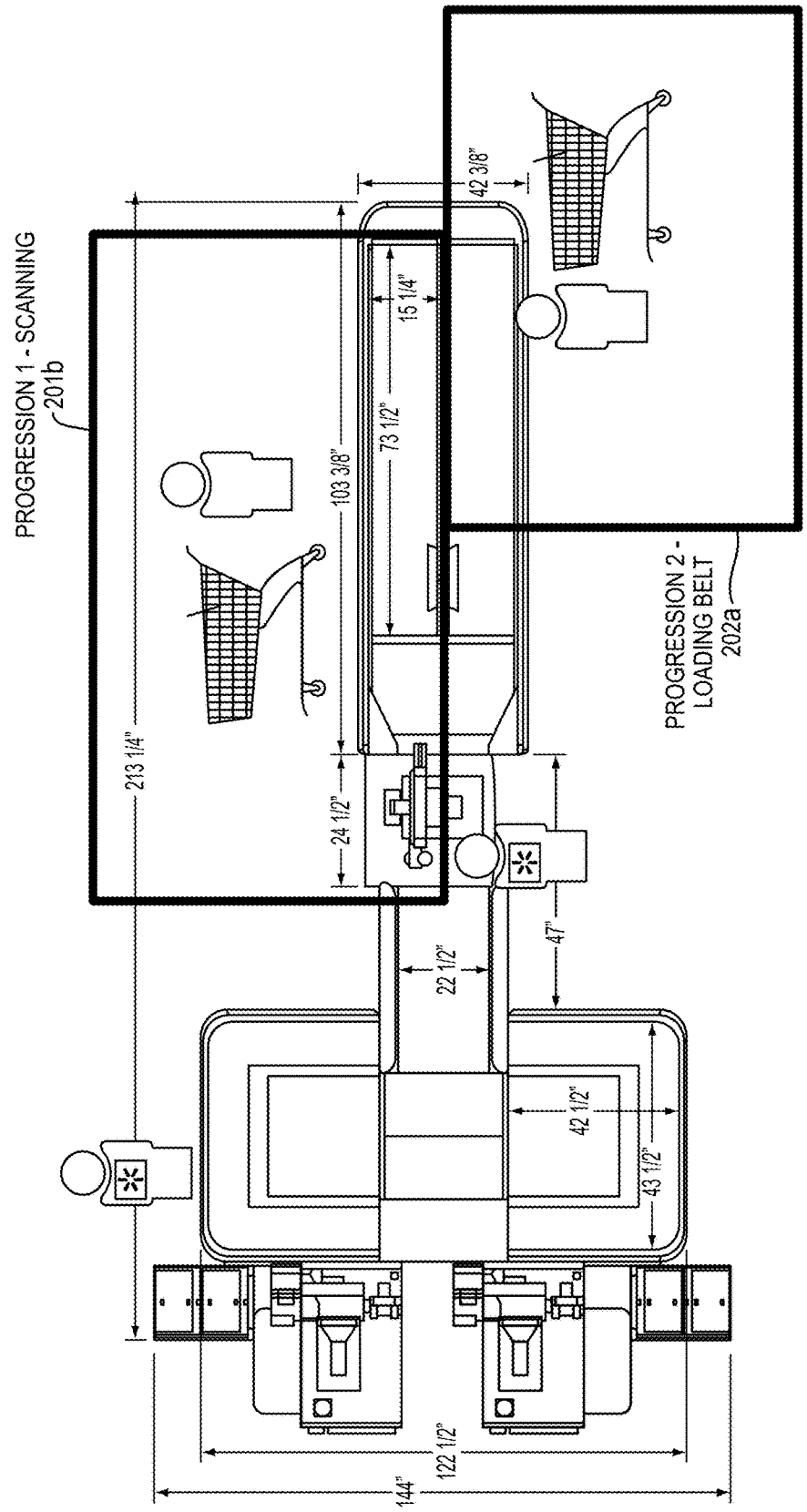
FIGS. 2A-2D are top views of the example high velocity checkout terminal of FIG. 1 which, in series, illustrate the temporal progression of activity through the high velocity checkout terminal in accordance with various embodiments.

FIGS. 2A-2D, illustrate an example of the temporal progression of activity through the high velocity checkout terminal 100 of FIG. 1 in accordance with various embodiments. As shown in FIG. 2A, Progression 1, associated with a first customer, is in the first progression scanning phase 201b. During the first progression scanning phase 201b, the first input conveyor 101a has been loaded and, having been instructed by the electronic controller 106, is actively transporting the first customer's products to the cashier station 105, where the cashier is scanning the first customer's products using the scanning device 109 and sending the scanned products to the selected output conveyor (the first output conveyor 115a as shown in FIGS. 2A-2D) for transportation to the selected bagging station (the first bagging station 117a as shown in FIGS. 2A-2D). Simultaneously, Progression 2, associated with a second customer, is in the second progression loading phase 202a. During the second progression loading phase 202a, the second input conveyor 101*b* is inactive and is being loaded with the second customer's products for subsequent scanning.

Figure 2B:
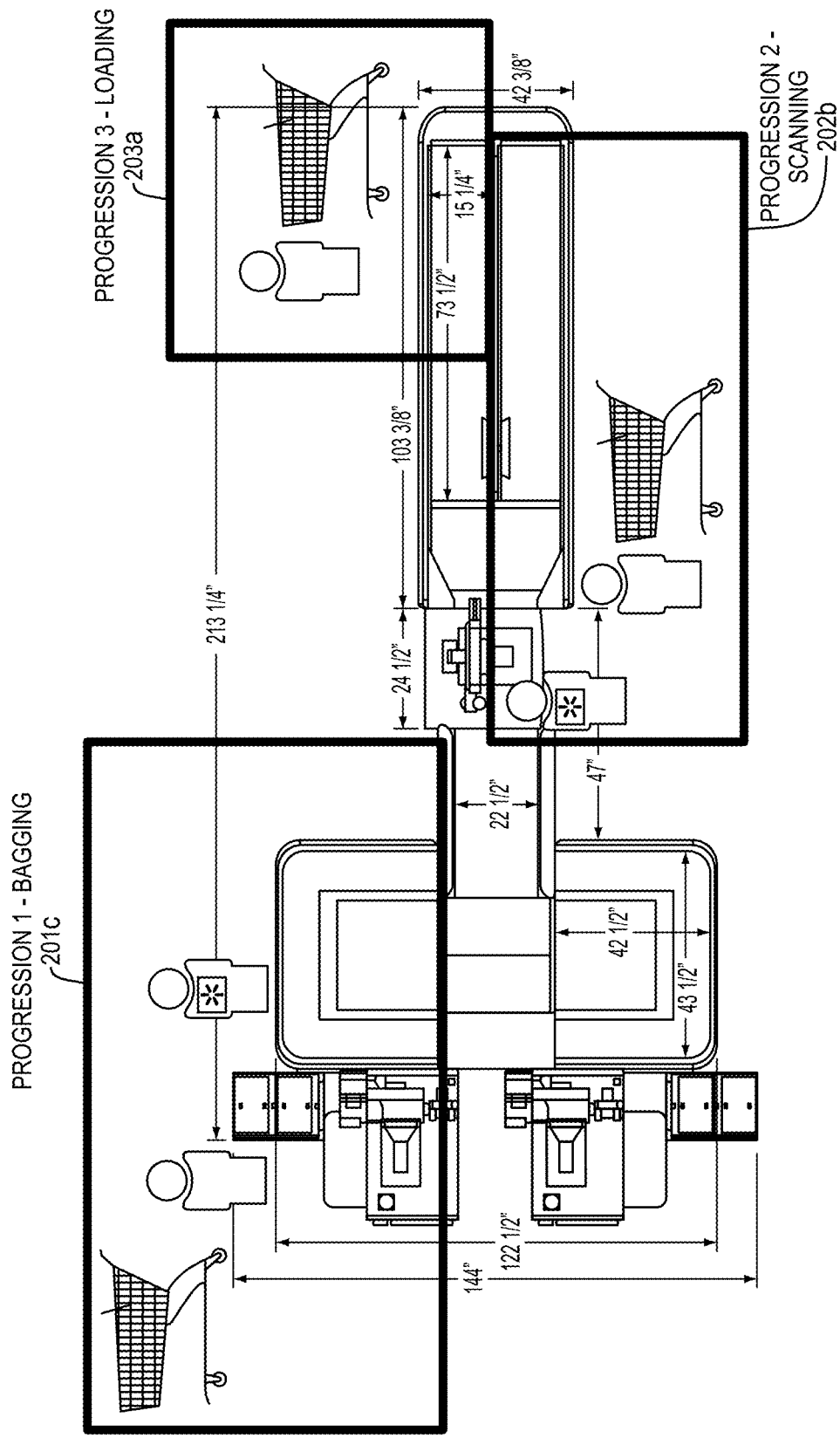

As shown in FIG. 2B, Progression 1 has completed the first progression scanning phase 201*b* and has entered the first progression bagging phase 201*c*. During the first progression bagging phase 201*c*, the first customer's products have been scanned and transported (e.g., via transfer conveyor 111, transverse conveyor 113, and the first output conveyor 115*a*) to the first bagging station 117*a*, where the first customer or an employee-associate is bagging the first customer's products. Simultaneously, Progression 2 has entered the second progression scanning phase 202*b*, wherein the second input conveyor 101*b* has been loaded and, having been instructed by the electronic controller 106, is actively transporting the second customer's products to the cashier station 105, where the cashier is scanning the second customer's products using the scanning device 109 and sending the scanned products to the selected output conveyor (the second output conveyor 115*b* as shown in FIGS. 2A-2D) for transportation to the selected bagging station (the second bagging station 117*b* as shown in FIGS. 2A-2D). Additionally, Progression 3, has entered the third progression loading phase 203*a* wherein the first input conveyor 101*a* is inactive and being loaded with the third customer's products for subsequent scanning.

Figure 2C:
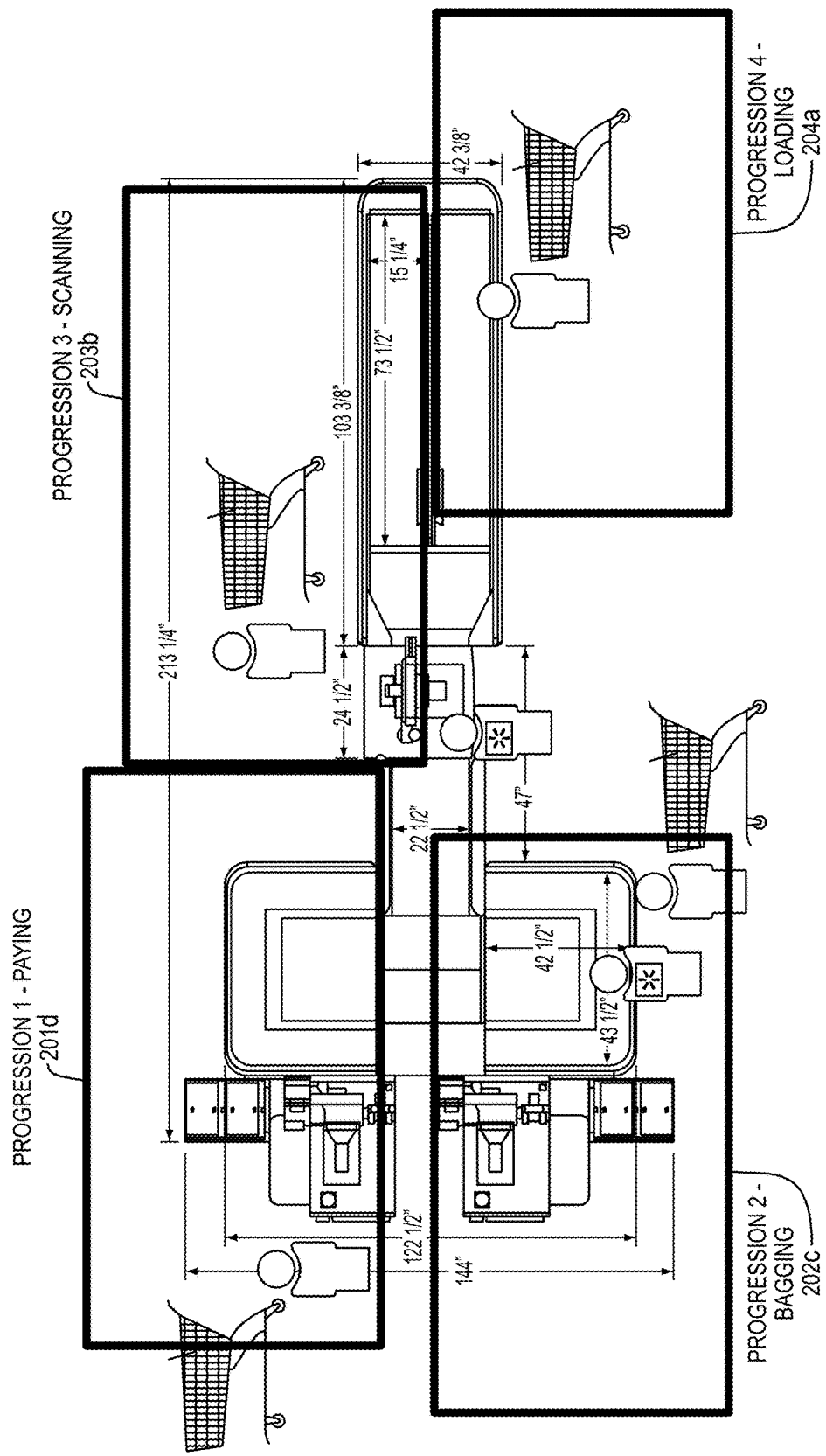

As shown in FIG. 2C, Progression 1 has completed the first progression bagging phase 201*c* and entered the first progression payment phase 201*d*. In the first progression payment phase 201*d*, the first customer's products have been scanned, bagged, and loaded into the first customer's cart so that the first bagging station 117*a* is cleared of the first customer's products and the first customer is now providing payment (e.g., via credit card, debit card, e-wallet, cash, check, or any other suitable, accepted form of tender) at the first payment terminal 119*a* for a cost of the first customer's products. Simultaneously, Progression 2 has entered the second progression bagging phase 202*c*, wherein the second customer's products have been scanned and transported (e.g., via transfer conveyor 111, transverse conveyor 113, and the second output conveyor 115*b*) to the second bagging station 117*b*, where the second customer or an employee-associate is bagging the second customer's products. Additionally, Progression 3 has entered the third progression scanning phase 203*b*, wherein the first input conveyor 101*a* has been loaded and, having been instructed by the electronic controller 106, is actively transporting the third customer's products to the cashier station 105, where the cashier is scanning the third customer's products using the scanning device 109 and sending the scanned products to the selected output conveyor (the first output conveyor 115*a* as shown in FIGS. 2A-2D) for transportation to the selected bagging station (the first bagging station 117*a* as shown in FIGS. 2A-2D). Furthermore, Progression 4, has entered the fourth progression loading phase 204*a* wherein the second input conveyor 101*b* is inactive and being loaded with the fourth customer's products for subsequent scanning.

Figure 2D:
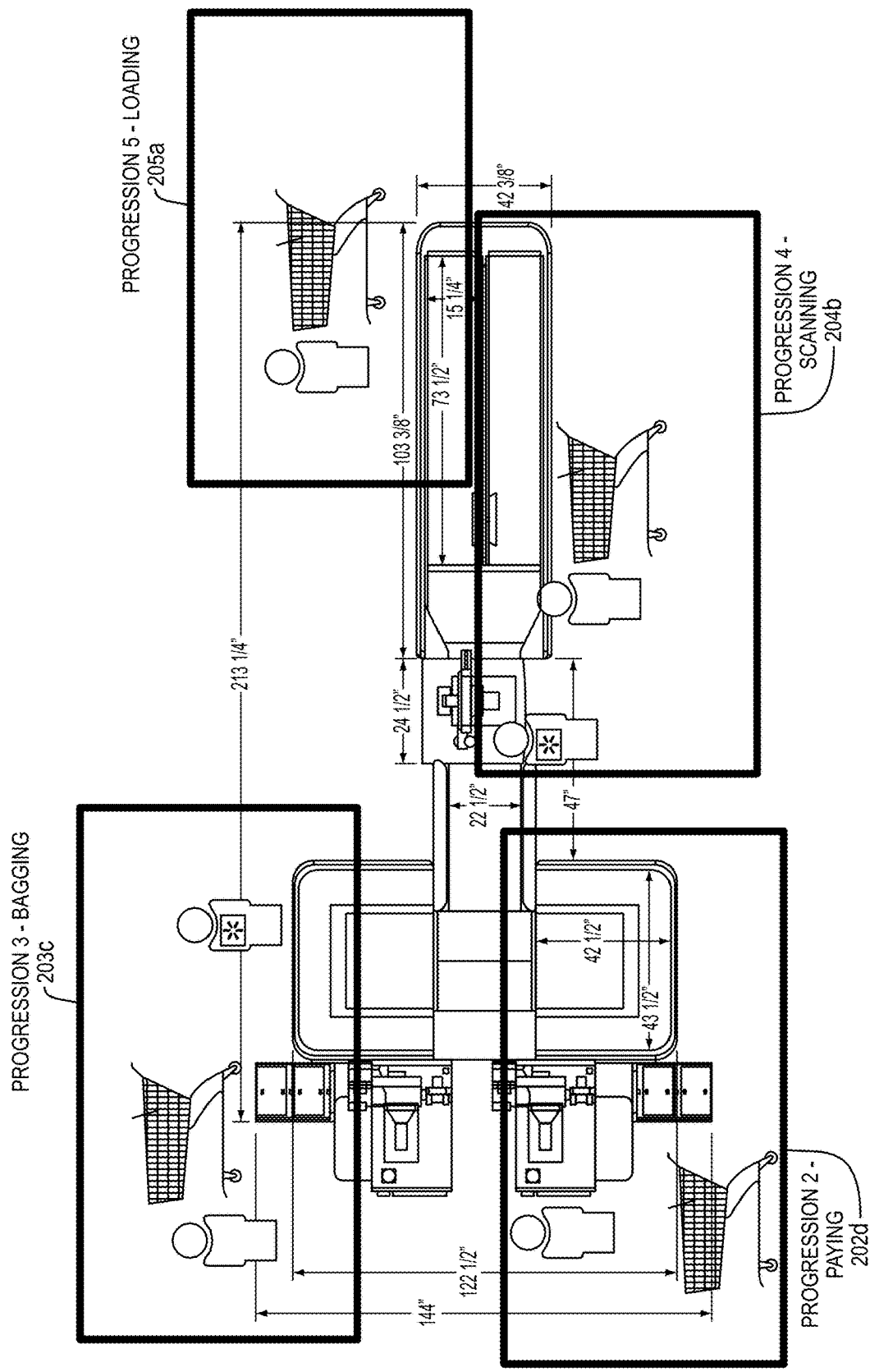

As shown in FIG. 2D, Progression 1 is complete and the first customer has left the checkout terminal 100. Additionally, Progression 2 has completed the second progression bagging phase 202*c* and entered the second progression payment phase 202*d*. In the second progression payment phase 202*d*, the first customer's products have been scanned, bagged, and loaded into the second customer's cart so that the second bagging station 117*b* is cleared of the second customer's products and the second customer is now providing payment (e.g., via credit card, debit card, e-wallet, cash, check, or any other suitable, accepted form of tender) at the second payment terminal 119*b* for a cost of the first customer's products. Simultaneously, Progression 3 has entered the third progression bagging phase 203*c*, wherein the third customer's products have been scanned and transported (e.g., via transfer conveyor 111, transverse conveyor 113, and the first output conveyor 115*a*) to the first bagging station 117*a*, where the third customer or an employee-associate is bagging the third customer's products. Additionally, Progression 4 has entered the fourth progression scanning phase 204*b*, wherein the second input conveyor 101*b* has been loaded and, having been instructed by the electronic controller 106, is actively transporting the fourth customer's products to the cashier station 105, where the cashier is scanning the third customer's products using the scanning device 109 and sending the scanned products to the selected output conveyor (the second output conveyor 115*b* as shown in FIGS. 2A-2D) for transportation to the selected bagging station (the second bagging station 117*b* as shown in FIGS. 2A-2D). Additionally, Progression 5, has entered the fifth progression loading phase 205*a* wherein the first input conveyor 101*a* is inactive and being loaded with the fifth customer's products for subsequent scanning.

Therefore, as evidenced by the progression illustrated by FIGS. 2A-2D, by using the high velocity checkout terminal 100, each customer can be continuously and actively participating in at least one phase of the checkout progression process, without needing to wait for prior progressions to complete the bagging and/or payment processes. Thus, the high velocity checkout terminal reduces customer wait time, keeps the customer engaged throughout the checkout process, and increases customer throughput. Additionally, because the employee-associate cashier can immediately alternate between progressions, without needing to assist with or wait for bagging and payment, the cashier can continuously scan products. Therefore, cashier inactivity is reduced and customer throughput per cashier is increased, thereby reducing staffing requirements on a per customer basis and, accordingly, reducing labor costs for the retailer.

FIG. 3 illustrates an example alternate embodiment wherein a high velocity checkout terminal 300 includes first and second input conveyors 301*a*, 301*b* leading to a cashier station 305 and first, second, and third parallel output conveyors 315*a*, 315*b*, 315*c* leading to first, second, and third bagging stations 317*a*, 317*b*, 317*c*. The high velocity checkout terminal 300 also includes a plurality of payment terminals 319 positioned remotely from (i.e., not co-located with) the other components of the high velocity checkout terminal 300. That is, the high velocity checkout terminal 300 of FIG. 3 is asymmetric because it includes two input conveyors 301*a*, 301*b* and three output conveyors 315*a*, 315*b*, 315*c*.

The first and second input conveyors 301*a*, 301*b*, the cashier station 305, the first, second, and third output conveyors 315*a*, 315*b*, 315*c*, the first, second, and third bagging stations 317*a*, 317*b*, 317*c*, and the plurality of payment terminals 319 can be similar, for example but not limited to, first and second input conveyors 101*a*, 101*b*, first and second output conveyors 115*a*, 115*b*, and first and second payment terminals 119*a*, 119*b* as described above with reference to FIGS. 1 and 2A-2D.

In operation, an electronic controller (not shown) of the cashier station 305 of the high velocity checkout terminal 300 can select, for each progression, a custom combination of input conveyors 301*a*, 301*b*, output conveyors 315*a*, 315*b*, 315*c*, and bagging stations 317*a*, 317*b*, 317*c*. Therefore, advantageously, if a first customer is still in the bagging phase at the first bagging station 317*a* upon completion of the scanning of a second customer's products (e.g., which have been routed to the second bagging station 317b via the second output conveyor 315b), the electronic controller can select the third output conveyor 315c and the third bagging station 317c for use in connection with scanning and routing a third customer's products. Upon completion of the bagging phase, each customer can then go to any one of the plurality of remote payment terminals 319 to tender payment for a cost of that customer's products.

Figure 4A:
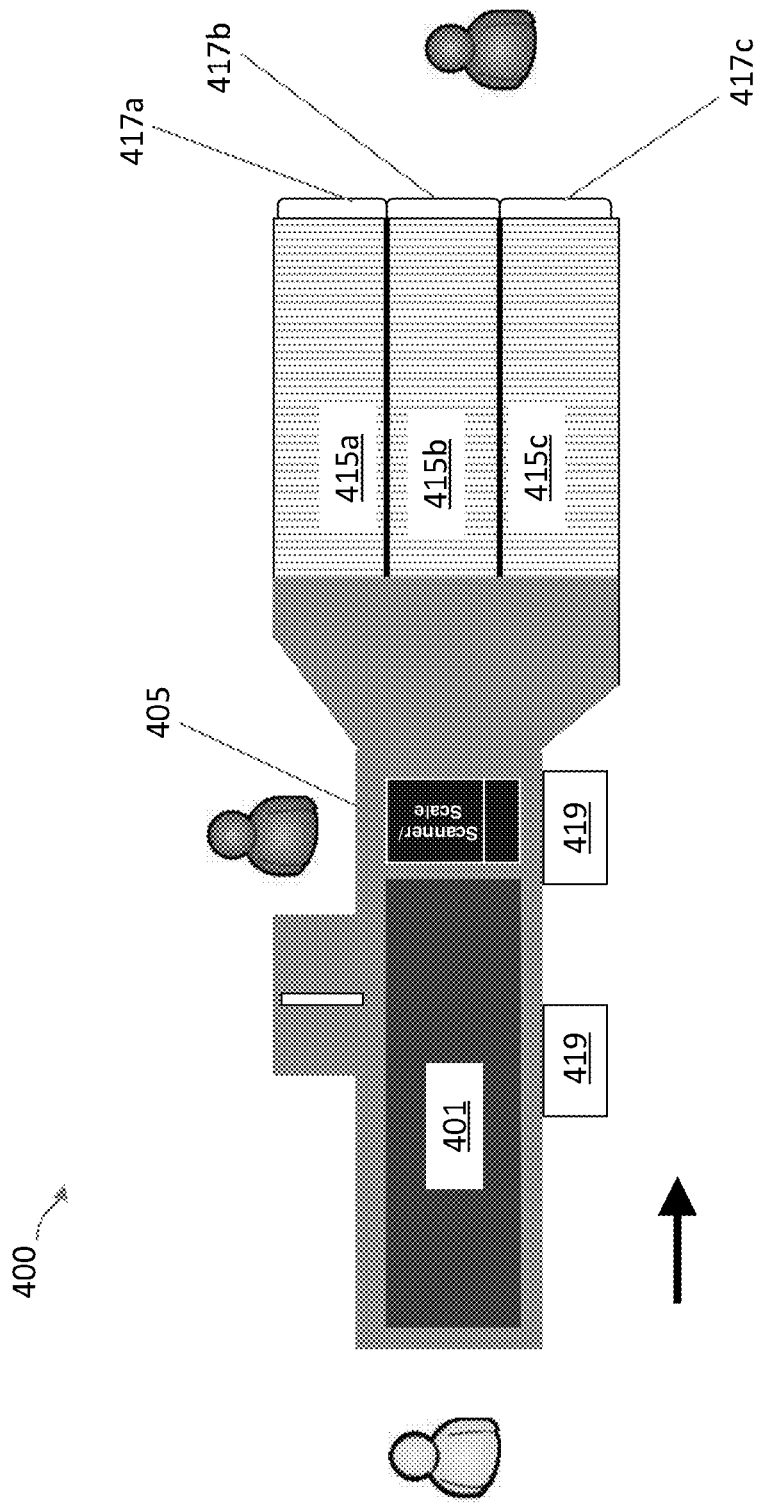
FIGS. 4A and 4B are top views of an example high velocity checkout terminal having one input and three parallel outputs in accordance with various embodiments.
Figure 4B:
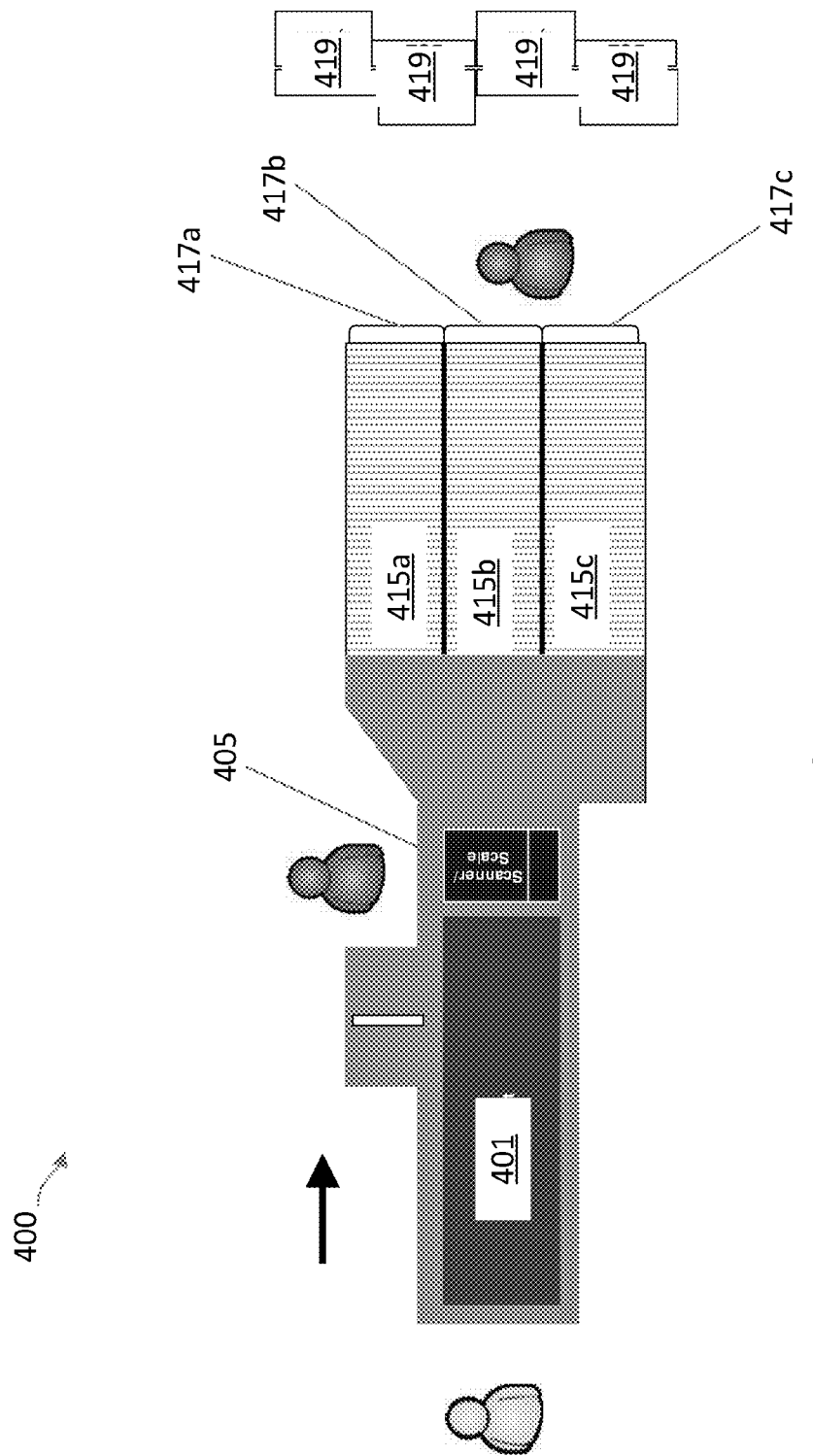

FIGS. 4A and 4B illustrate an example alternate embodiment wherein a high velocity checkout terminal 400 includes modular, movable payment terminals 419. The high velocity checkout terminal 400 includes single input conveyor 401 leading to a cashier station 405 and first, second, and third parallel output conveyors 415a, 415b, 415c leading to first, second, and third bagging stations 417a, 417b, 417c. The high velocity checkout terminal 400 also includes a plurality of payment terminals 419 that can be positioned in any configuration relative to the other components (e.g., the input conveyor 401 leading to a cashier station 405 and first, second, and third parallel output conveyors 415a, 415b, 415c leading to first, second, and third bagging stations 417a, 417b, 417c). For example, as shown in FIG. 4A, two modular, movable payment terminals 419 can be positioned adjacent the input conveyor 401 and cashier station 405. Alternatively or additionally, as shown in FIG. 4B, for example, a plurality of modular, movable payment terminals 419 can be positioned remotely from (i.e., not co-located with) the other components of the high velocity checkout terminal 400. The high velocity checkout terminal 400 of FIGS. 4A and 4B is asymmetric because it includes one input conveyor 401 and three output conveyors 415a, 415b, 415c.

The input conveyors 401, the cashier station 405, the first, second, and third output conveyors 415a, 415b, 415c, the first, second, and third bagging stations 417a, 417b, 417c, and the plurality of modular, movable payment terminals 419 can be similar, for example but not limited to, first and second input conveyors 101a, 101b, first and second output conveyors 115a, 115b, and first and second payment terminals 119a, 119b as described above with reference to FIGS. 1 and 2A-2D.

In operation, an electronic controller (not shown) of the cashier station 405 of the high velocity checkout terminal 400 can select, for each progression, a custom combination of the input conveyor 401, output conveyors 415a, 415b, 415c, and bagging stations 417a, 417b, 417c. Therefore, advantageously, if a first customer is still in the bagging phase at the first bagging station 417a upon completion of the scanning of a second customer's products (e.g., which have been routed to the second bagging station 417b via the second output conveyor 415b), the electronic controller can select the third output conveyor 415c and the third bagging station 417c for use in connection with scanning and routing a third customer's products. Upon completion of the bagging phase, each customer can then go to any one of the plurality of modular, movable payment terminals 419 to tender payment for a cost of that customer's products.

Figure 5:
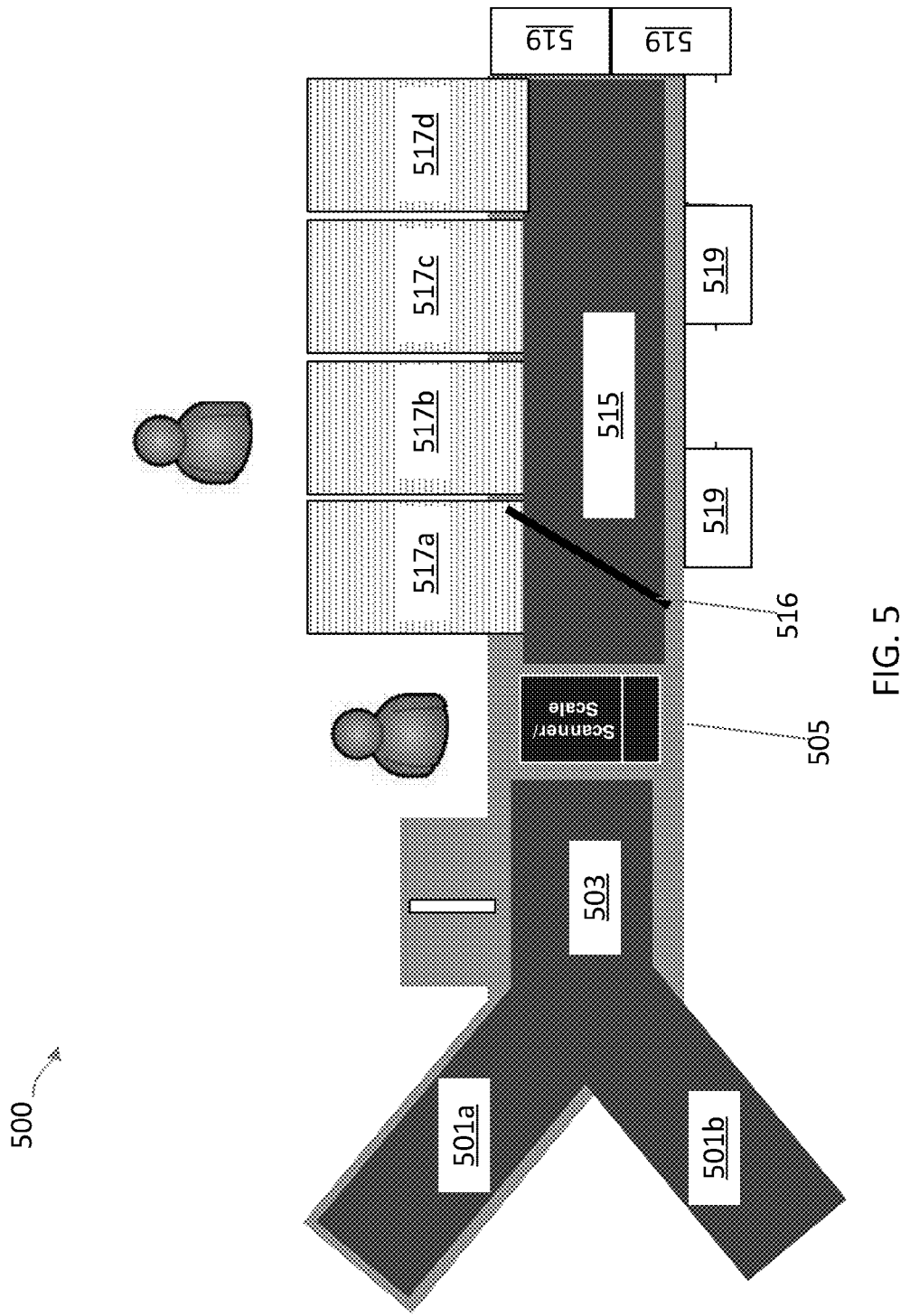
FIG. 5 is a top view of an example high velocity checkout terminal having two input conveyors, one output conveyor, and four bagging stations in accordance with various embodiments.

FIG. 5 illustrates an example alternate embodiment wherein a high velocity checkout terminal 500 includes first and second input conveyors 501a, 501b leading to a pre-scan holding area 503, which leads to a cashier station 505, which leads to a single output conveyor 515. The output conveyor 515 leads to first, second, third, and fourth bagging stations 517a, 517b, 517c, 517d. Products are directed to an appropriate one of the first, second, third, and fourth bagging stations 517a, 517b, 517c, 517d by a repositionable guide arm 516. The high velocity checkout terminal 500 also includes a plurality of payment terminals 519 positioned adjacent the output conveyor 515.

The first and second input conveyors 501a, 501b, the pre-scan holding area 503, the cashier station 505, the output conveyor 515, the first, second, third, and fourth bagging stations 517a, 517b, 517c, 517d, and the plurality of payment terminals 519 can be similar, for example but not limited to, first and second input conveyors 101a, 101b, pre-scan holding area 103, first and second output conveyors 115a, 115b, and first and second payment terminals 119a, 119b as described above with reference to FIGS. 1 and 2A-2D. Repositionable guide arm 516 can be constructed of any suitable material (e.g., wood, metal, plastic, polymers, ceramic, composites, fiberglass, any other suitable material, or combinations thereof). The repositionable arm 516 can, in accordance with various embodiments, to be selectively translated along a length of the output conveyor 515. Furthermore, the repositionable guide arm 516, in accordance with various embodiments, can be configured for adjustment an angle thereof relative to a movement axis of the output conveyor 515.

In operation, an electronic controller (not shown) of the cashier station 505 of the high velocity checkout terminal 500 can select, for each progression, a custom combination of input conveyors 501a, 501b, the output conveyors 515, and bagging stations 517a, 517b, 517c, 517d, in part by instructing repositioning of the repositionable guide arm 516. Therefore, if a first customer is still in the bagging phase at the first bagging station 517a upon completion of the scanning of a second customer's products (e.g., which have been routed to the second bagging station 517b), the electronic controller can reposition the repositionable guide arm 516 to select the third bagging station 517c for use in connection with scanning and routing a third customer's products. Upon completion of the bagging phase, each customer can then go to any one of the plurality of payment terminals 519 to tender payment for a cost of that customer's products. Alternatively, in accordance with some embodiments, each of the bagging stations 517a, 517b, 517c, 517d can be paired with one of the plurality of payment terminals 519.

Figure 6:
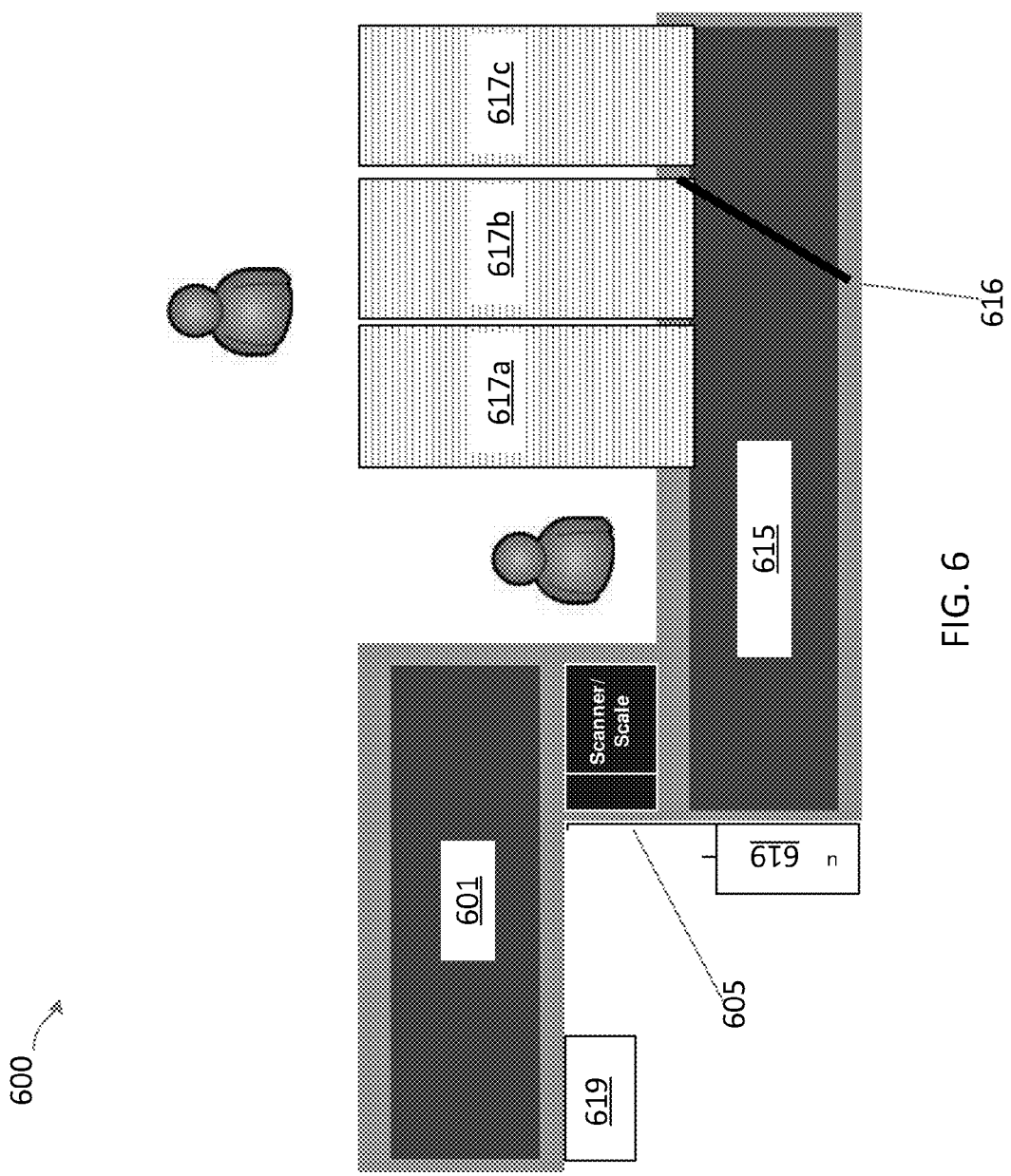
FIG. 6 is a top view of an example high velocity checkout terminal having one input conveyor laterally offset from one output conveyor and three bagging stations in accordance with various embodiments.

FIG. 6 illustrates an example alternate embodiment wherein a high velocity checkout terminal 600 includes a single input conveyor 601 leading to a cashier station 605, which leads to a single output conveyor 615, parallel to and offset from the input conveyor 601. The output conveyor 615 leads to first, second, and third bagging stations 617a, 617b, 617c. Products are directed to an appropriate one of the first, second, and third bagging stations 617a, 617b, 617c by a repositionable guide arm 616. The high velocity checkout terminal 600 also includes a payment terminal 619 positioned adjacent the output conveyor 615.

The input conveyor 601, the cashier station 605, the output conveyor 615, the first, second, and third bagging stations 617a, 617b, 617c, and the payment terminal 619 can be similar, for example but not limited to, first and second input conveyors 101a, 101b, pre-scan holding area 103, first and second output conveyors 115a, 115b, and first and second payment terminals 119a, 119b as described above with reference to FIGS. 1 and 2A-2D. Repositionable guide arm 616 can be constructed of any suitable material (e.g., wood, metal, plastic, polymers, ceramic, composites, fiberglass, any other suitable material, or combinations thereof). The repositionable arm 616 can, in accordance with various embodiments, to be selectively translated along a length of the output conveyor 615. Furthermore, the repositionable guide arm 616, in accordance with various embodiments, can be configured for adjustment an angle thereof relative to a movement axis of the output conveyor 615.

In operation, an electronic controller (not shown) of the cashier station 605 of the high velocity checkout terminal 600 can select, for each progression, select one of the bagging stations 617a, 617b, 617c by instructing repositioning of the repositionable guide arm 616. Therefore, if a first customer is still in the bagging phase at the first bagging station 617a upon completion of the scanning of a second customer's products (e.g., which have been routed to the second bagging station 617b), the electronic controller can reposition the repositionable guide arm 616 to select the third bagging station 617c for use in connection with scanning and routing a third customer's products. Upon completion of the bagging phase, each customer can then go to the payment terminal 619 to tender payment for a cost of that customer's products.

Figure 7:
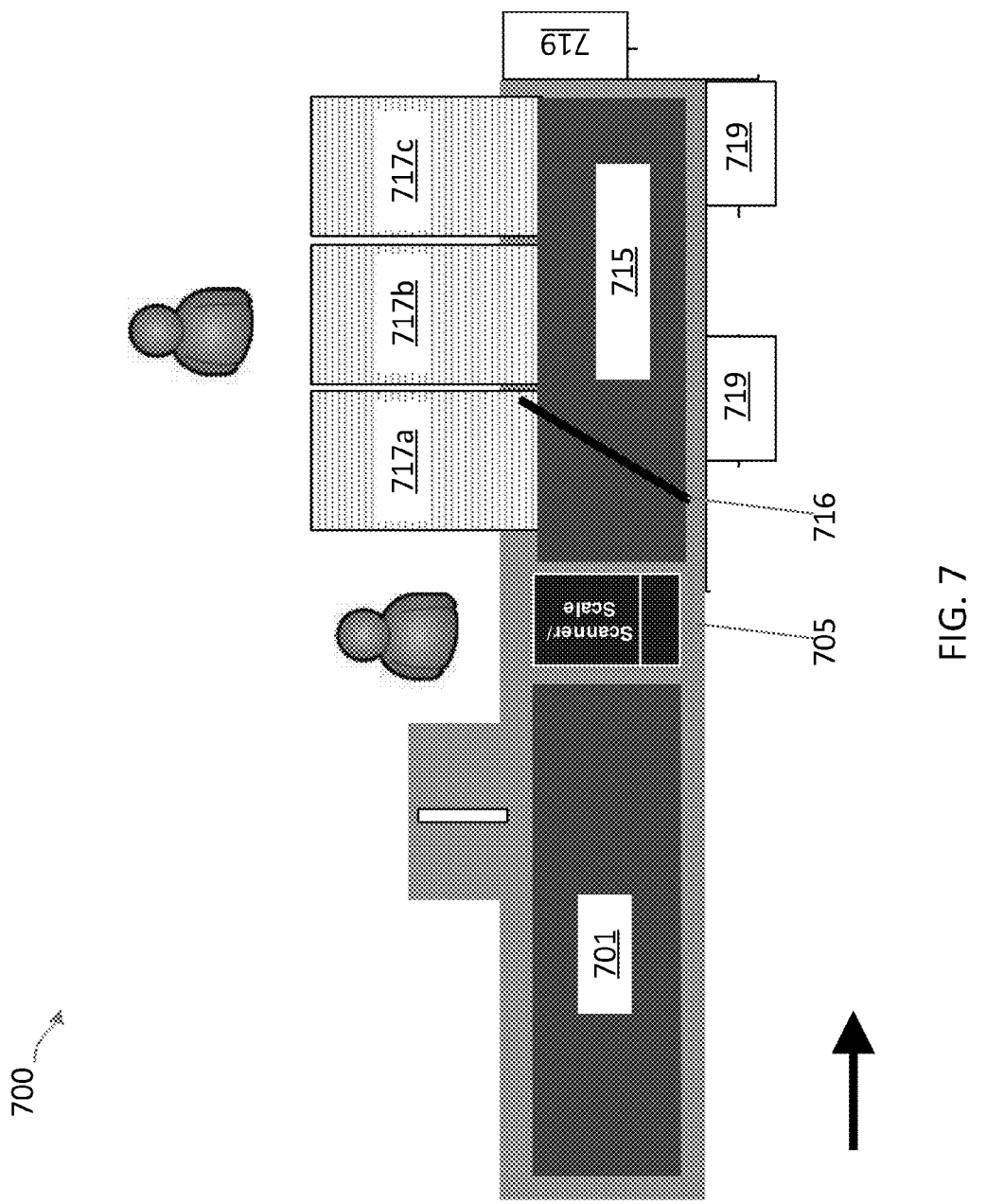
FIG. 7 is a top view of an example high velocity checkout terminal having one input conveyor axially aligned with one output conveyor and three bagging stations in accordance with various embodiments.

FIG. 7 illustrates an example alternate embodiment wherein a high velocity checkout terminal 700 includes a single input conveyor 701 leading to a cashier station 705, which leads to a single output conveyor 715, in linear alignment with the input conveyor 701. The output conveyor 715 leads to first, second, and third bagging stations 717a, 717b, 717c. Products are directed to an appropriate one of the first, second, and third bagging stations 717a, 717b, 717c by a repositionable guide arm 716. The high velocity checkout terminal 700 also includes a plurality of payment terminals 719 positioned adjacent the output conveyor 715.

The input conveyor 701, the cashier station 705, the output conveyor 715, the first, second, and third bagging stations 717a, 717b, 717c, and the payment terminals 719 can be similar, for example but not limited to, first and second input conveyors 101a, 101b, pre-scan holding area 103, first and second output conveyors 115a, 115b, and first and second payment terminals 119a, 119b as described above with reference to FIGS. 1 and 2A-2D. Repositionable guide arm 716 can be constructed of any suitable material (e.g., wood, metal, plastic, polymers, ceramic, composites, fiberglass, any other suitable material, or combinations thereof). The repositionable arm 716 can, in accordance with various embodiments, to be selectively translated along a length of the output conveyor 715. Furthermore, the repositionable guide arm 716, in accordance with various embodiments, can be configured for adjustment an angle thereof relative to a movement axis of the output conveyor 715.

In operation, an electronic controller (not shown) of the cashier station 705 of the high velocity checkout terminal 700 can select, for each progression, select one of the bagging stations 717a, 717b, 717c by instructing repositioning of the repositionable guide arm 716. Therefore, if a first customer is still in the bagging phase at the first bagging station 717a upon completion of the scanning of a second customer's products (e.g., which have been routed to the second bagging station 717b), the electronic controller can reposition the repositionable guide arm 716 to select the third bagging station 717c for use in connection with scanning and routing a third customer's products. Upon completion of the bagging phase, each customer can then go to any of the payment terminals 719 to tender payment for a cost of that customer's products. Alternatively, in accordance with some embodiments, each of the bagging stations 717a, 717b, 717c can be paired with one of the plurality of payment terminals 719.

Figure 8:
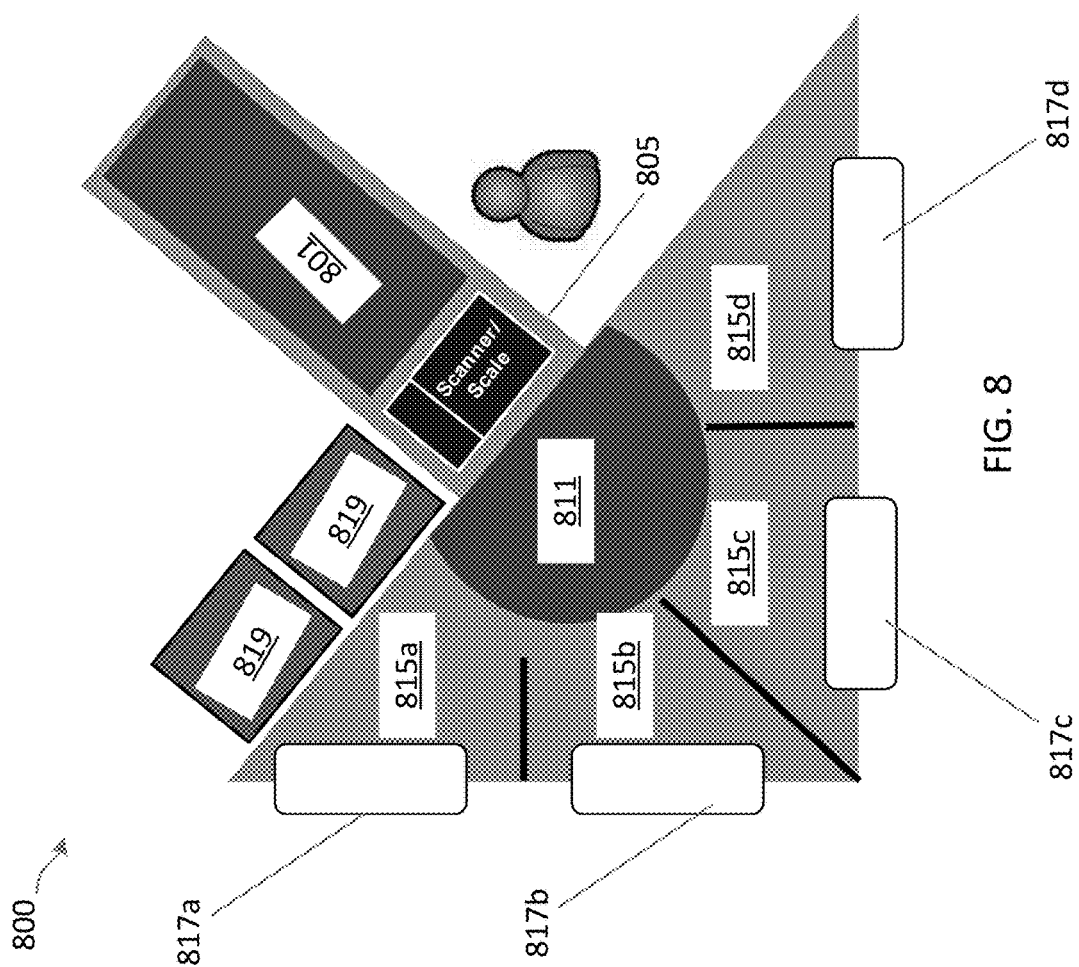
FIG. 8 is a top view of an example high velocity checkout terminal having one input conveyor and a triangular output area divided into four output conveyors in accordance with various embodiments.

FIG. 8 illustrates an example alternate embodiment wherein a high velocity checkout terminal 800 includes a single input conveyor 801 leading to a cashier station 805, which leads to first, second, third, and fourth output conveyors 815a, 815b, 815c, 815d in a triangular or "delta wing" configuration. The output conveyors 815a, 815b, 815c, 815d lead, respectively, to first, second, third, and fourth bagging stations 817a, 817b, 817c, 817d. Products are directed to an appropriate one of the first, second, third, and fourth bagging stations 817a, 817b, 817c, 817d by a transfer conveyor 811. The high velocity checkout terminal 800 also includes a plurality of payment terminals 819 positioned adjacent the output conveyors 815a, 815b, 815c, 815d.

The input conveyor 801, the cashier station 805, the transfer conveyor 811, the output conveyors 815a, 815b, 815c, 815d, the bagging stations 817a, 817b, 817c, 817d, and the payment terminals 819 can be similar, for example but not limited to, first and second input conveyors 101a, 101b, pre-scan holding area 103, transfer conveyor 111, first and second output conveyors 115a, 115b, and first and second payment terminals 119a, 119b as described above with reference to FIGS. 1 and 2A-2D.

In operation, an electronic controller (not shown) of the cashier station 805 of the high velocity checkout terminal 800 can select, for each progression, a custom combination of the input conveyor 801, output conveyors 815a, 815b, 815c, 815d, and bagging stations 817a, 817b, 817c, 817d. Therefore, advantageously, if a first customer is still in the bagging phase at the first bagging station 817a upon completion of the scanning of a second customer's products (e.g., which have been routed to the second bagging station 817b via the second output conveyor 815b), the electronic controller can select the third output conveyor 815c and the third bagging station 817c for use in connection with scanning and routing a third customer's products. Upon completion of the bagging phase, each customer can then go to any one of the plurality of payment terminals 819 to tender payment for a cost of that customer's products.

Figure 9:
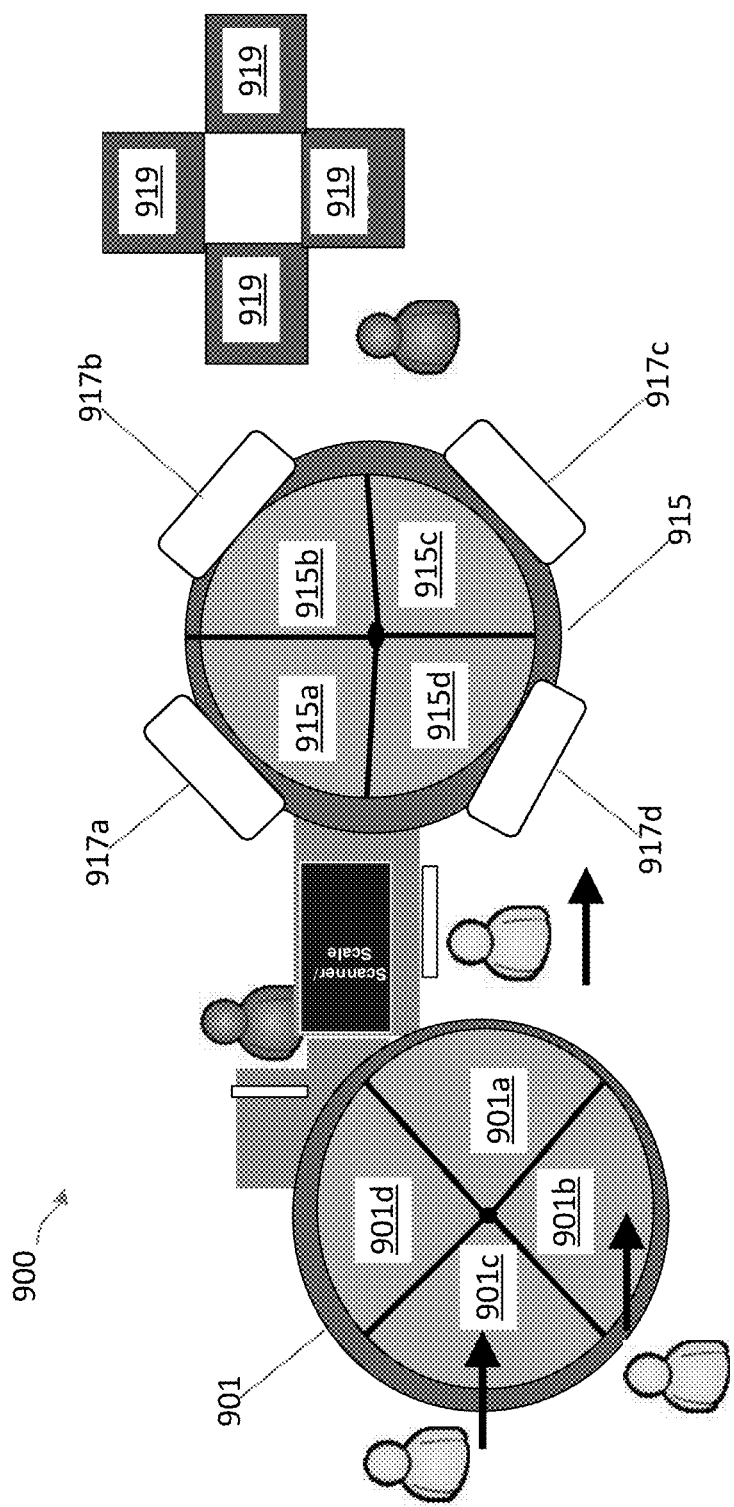
FIG. 9 is a top view of an example high velocity checkout terminal having a rotary input conveyor and a rotary output conveyor in accordance with various embodiments.

FIG. 9 illustrates an example alternate embodiment wherein the input conveyor 901 is a rotating wheel configuration having a plurality of input sections 901a, 901b, 901c, 901d which can be separated, for example, by one or more dividing walls or partitions. The input conveyor 901 is then incrementally rotated, for each customer, from a loading position (e.g., 901b or 901c as shown) to a scanning position (e.g., as 901a is approaching and 901d is departing as shown) wherein the cashier can remove products from the relevant input section 901a, 901b, 901c, 901d and scan the products. The output conveyor 915, as shown, is also a rotating wheel configuration having a plurality of output sections 915a, 915b, 915c, 915d which can be separated, for example, by one or more dividing walls or partitions. The output conveyor 915 is then incrementally rotated, for each customer, from a bagging position (e.g., 915b or 915c as shown) to an output loading position (e.g., as 915a is approaching and 915d is departing as shown) wherein the cashier can place scanned products onto the relevant input section 901a, 901b, 901c, 901d for bagging at a corresponding bagging station 917a, 917b, 917c, 917d. Upon completion of the bagging phase, each customer can then go to any one of the plurality of remote payment terminals 919 to tender payment for a cost of that customer's products.

Referring now to FIG. 10, a method 1000 is provided for operating a high velocity checkout terminal. The method includes a step 1001 of instructing, by an electronic controller of a cashier station, in response to receiving a first user instruction at a user interface of the cashier station, a first input conveyor to transport first products to a cashier station. The method also includes a step 1003 of instructing, by the electronic controller of the cashier station, in response to receiving a second user instruction at the user interface of the cashier station, a second input conveyor to transport second products to the cashier station. At step 1005, the method includes scanning, by a scanning device of the cashier station, at least one of the first products or the second products transported to the scanning device. At step 1007, the method includes instructing, by the electronic controller, a first output conveyor to receive and transport the at least one of the first products or the second products to a first bagging station. At step 1009, the method includes instructing, by the electronic controller, a second output conveyor to receive and transport the at least one of the first products or the second products to a second bagging station. At step 1011, the method includes accepting, at first and second payment terminals positioned downstream of or co-located with a portion of the first and second output conveyors, payment for a cost associated with at least one of the first products or the second products.

The step 1001 of instructing, by an electronic controller of a cashier station, in response to receiving a first user instruction at a user interface of the cashier station, a first input conveyor to transport first products to a cashier station can be performed, for example but not limited to, using the electronic controller 106 of the cashier station 105 to instruct the first input conveyor 101*a* to transport first products to the cashier station 105 as described above with reference to FIG. 1. The step 1003 of instructing, by the electronic controller of the cashier station, in response to receiving a second user instruction at the user interface of the cashier station, a second input conveyor to transport second products to the cashier station can be performed, for example but not limited to, using the electronic controller 106 of the cashier station 105 to instruct the second input conveyor 101*b* to transport first products to the cashier station 105 as described above with reference to FIG. 1. The step 1005 of scanning, by a scanning device of the cashier station, at least one of the first products or the second products transported to the scanning device can be performed, for example but not limited to, using the scanning device 109 of cashier station 105 as described above with reference to FIG. 1.

The step 1007 of instructing, by the electronic controller, a first output conveyor to receive and transport the at least one of the first products or the second products to a first bagging station can be performed, for example but not limited to, using the electronic controller 106 of the cashier station 105 to instruct the first output conveyor 115*a* to transport products to the first bagging station 117*a* as described above with reference to FIG. 1. The step 1009 of instructing, by the electronic controller, a second output conveyor to receive and transport the at least one of the first products or the second products to a second bagging station can be performed, for example but not limited to, using the electronic controller 106 of the cashier station 105 to instruct the second output conveyor 115*b* to transport products to the second bagging station 117*b* as described above with reference to FIG. 1. The step 1011 of accepting, at first and second payment terminals positioned downstream of or co-located with a portion of the first and second output conveyors, payment for a cost associated with at least one of the first products or the second products can be performed, for example but not limited to, using first and second payment terminals 119*a*, 119*b* as described above with reference to FIG. 1.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A high velocity checkout terminal comprising:
   a first input conveyor configured to transport first products to a cashier station in response to receiving a first initiation instruction from an electronic controller of the cashier station;
   a second input conveyor, separately operable from the first input conveyor, the second input conveyor configured to transport second products to the cashier station in response to receiving a second initiation instruction from the electronic controller of the cashier station;
   one or more sensors disposed on the first and second input conveyers, the one or more sensors configured to detect the first and second products placed on the first and second input conveyer;
   the cashier station positioned to receive at least one of the first products or the second products, the cashier station including:
      a scanning device configured to scan at least one of the first products or the second products,
      a user input device, and
      the electronic controller in electronic communication with the first input conveyor, the second input conveyor, and the one or more sensors disposed on the first and second input conveyer, the electronic controller configured to automatically transmit the first initiation instruction and the second initiation instruction;
   a first output conveyor positioned to receive the first products that are scanned at the cashier station and configured to transport the scanned first products to a first bagging station in response to receiving a first output instruction from the electronic controller of the cashier station;
   a second output conveyor, separately operable from the first output conveyor, the second output conveyor positioned to receive the second products that are scanned at the cashier station and configured to transport the scanned second products to a second bagging station in response to receiving a second output instruction from the electronic controller of the cashier station;
   first and second payment terminals positioned downstream of or co-located with a portion of the first and second output conveyors, the first and second payment terminals configured to accept payment for a cost associated with at least one of the first products or the second products, wherein the electronic controller is further configured to activate the first input conveyer, the first output conveyer, and the first payment terminal based on the one or more sensors detecting the first products on the first input conveyer, and wherein the electronic controller is additionally configured to activate the second input conveyer, the second output conveyer and the second payment terminal based on the one or more sensors detecting the second products on the second input conveyer.

2. The high velocity checkout terminal of claim 1, wherein the first output conveyer is further configured to transport the scanned second products to the first bagging station in response to receiving the second output instruction from the electronic controller of the cashier station.

3. The high velocity checkout terminal of claim 1, wherein the second output conveyer is further configured to transport the scanned second products to the first bagging station in response to receiving the first output instruction from the electronic controller of the cashier station.

4. The high velocity checkout terminal of claim 1, wherein the first and second payment terminals are positioned downstream of the first and second bagging stations.

5. The high velocity checkout terminal of claim 1, wherein the cashier station further comprises a display device for displaying product information associated with one or more products scanned by the scanning device.

6. The high velocity checkout terminal of claim 5, wherein the display device and the user input device are at least one of separate devices or are integrated in a touch-screen device.

7. The high velocity checkout terminal of claim 1,
wherein the first input conveyor is configured to terminate transportation of the first products in response to receiving a first termination instruction from the electronic controller, and
wherein the second input conveyor is configured to terminate transportation of the second products in response to receiving a second termination instruction from the electronic controller.

8. The high velocity checkout terminal of claim 1, further comprising a third output conveyor, separately operable from the first and second output conveyors, the third output conveyor positioned to receive at least one of the first or second products that are scanned at the cashier station and configured to transport the scanned first products to a third bagging station in response to receiving the first output instruction from the electronic controller of the cashier station.

9. The high velocity checkout terminal of claim 8, wherein the third output conveyor is further configured to transport the scanned second products to the third bagging station in response to receiving the second output instruction from the electronic controller of the cashier station.

10. The high velocity checkout terminal of claim 8,
wherein each of the first, second, and third bagging stations includes an activity sensor for detecting bagging activity, the activity sensor in electronic communication with the electronic controller,
wherein the electronic controller is configured, in response to receiving an indication of bagging activity from the activity sensor, to transmit at least one of the first output instruction or the second output instruction to a different one of the first, second, and third output conveyors.

11. The high velocity checkout terminal of claim 10, wherein the activity sensor is at least one of a pressure sensor, a weight sensor, a motion sensor, a video camera, an optical sensor, or an infrared sensor.

12. The high velocity checkout terminal of claim 1, further comprising a third input conveyor, separately operable from the first input conveyor and the second output conveyor, the third input conveyor configured to transport third products to the cashier station in response to receiving a third initiation instruction from the electronic controller of the cashier station.

13. The high velocity checkout terminal of claim 1, wherein the scanning device is at least one of an optical scanner, a radio frequency identification (RFID reader), a barcode scanner, a digital camera, or a handheld barcode reader.

14. A method for operating a high velocity checkout terminal comprising:
detecting, via one or more sensors disposed on a first and second input conveyer and in communication with an electronic terminal, first and second products placed on the first and second input conveyer;
activating, with the electronic controller, the first input conveyer, a first output conveyer, and a first payment terminal based on the one or more sensors detecting the first products on the first input conveyer, the activating of the first input conveyer transporting the first products to a scanning device on a cashier station;
activating with the electronic controller, the second input conveyer, a second output conveyer and a second payment terminal based on the one or more sensors detecting the second products on the second input conveyer, the activating of the second input conveyer transporting the second products to the scanning device on the cashier station;
scanning, by the scanning device of the cashier station, at least one of the first products or the second products transported to the scanning device;
transporting the at least one of the first products or the second products to a first bagging station;
transporting the at least one of the first products or the second products to a second bagging station; and
accepting, at the first and second payment terminals positioned downstream of or co-located with a portion of the first and second output conveyors, payment for a cost associated with at least one of the first products or the second products.

15. The method of claim 14, wherein the cashier station further comprises a display device for displaying product information associated with one or more products scanned by the scanning device.

16. The method of claim 14, further comprising instructing, by the electronic controller, a third output conveyor to receive and transport the at least one of the first products or the second products to a third bagging station.

17. The method of claim 16,
wherein each of the first, second, and third bagging stations includes an activity sensor for detecting bagging activity, the activity sensor in electronic communication with the electronic controller,
wherein the electronic controller is configured, in response to receiving an indication of bagging activity from the activity sensor, to activate a different one of the first, second, and third output conveyors.

18. The method of claim 14, further comprising:
instructing, by the electronic controller, the first input conveyer to terminate transportation of the first products; and
instructing, by the electronic controller, the second input conveyor to terminate transportation of the second products.

19. The method of claim 18,
wherein the one or more sensors disposed on the first input conveyer are configured to detect an absence of first products on the first input conveyor, and
wherein the electronic controller is configured, in response to receiving an indication of an absence of first products on the first input conveyor from the one or more sensors disposed on the first input conveyer, to automatically transmit the instructions to the first input conveyor to terminate transportation of the first products.

20. The method of claim 18,
wherein the one or more sensors disposed on the second input conveyer are configured to detect an absence of second products on the second input conveyor, and
wherein the electronic controller is configured, in response to receiving an indication of an absence of second products on the second input conveyor from the one or more sensors disposed on the second input conveyor, to automatically transmit the instructions to the second input conveyor to terminate transportation of the second products.

21. The method of claim 18,
wherein the electronic controller is configured to automatically transmit the instructions to the first input conveyor to terminate transportation of the first products in response to receiving at least one of the second user instruction or an additional user instruction, and
wherein the electronic controller is configured to automatically transmit the instructions to the second input conveyor to terminate transportation of the second products in response to receiving at least one of the first user instruction or the additional user instruction.

22. The method of claim 14, further comprising instructing, by the electronic controller of the cashier station, in response to receiving a third user instruction at the user interface of the cashier station, a third input conveyor to transport third products to the cashier station.

* * * * *